(12) United States Patent
Neafsey et al.

(10) Patent No.: US 9,787,684 B2
(45) Date of Patent: Oct. 10, 2017

(54) NETWORKED ACCESS CONTROL SYSTEM

(71) Applicant: Schlage Lock Company LLC, Carmel, IN (US)

(72) Inventors: Jeffrey S. Neafsey, Arvada, CO (US); Joseph W. Baumgarte, Carmel, IN (US); Matthew Dexter, Indianapolis, IN (US); Ed Harrold, Brooksville, FL (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 15/276,118

(22) Filed: Sep. 26, 2016

(65) Prior Publication Data

US 2017/0012777 A1   Jan. 12, 2017

Related U.S. Application Data

(63) Continuation of application No. 14/796,501, filed on Jul. 10, 2015, now Pat. No. 9,531,721.
(Continued)

(51) Int. Cl.
*H04L 29/06* (2006.01)
*G07C 9/00* (2006.01)
(Continued)

(52) U.S. Cl.
CPC .......... *H04L 63/10* (2013.01); *G07C 9/00571* (2013.01); *H04L 9/3213* (2013.01);
(Continued)

(58) Field of Classification Search
CPC ..................................................... H04L 63/10
See application file for complete search history.

(56) References Cited

U.S. PATENT DOCUMENTS 7,526,934 B2 * 5/2009 Conforti ............ G07C 9/00103
340/5.7
9,324,203 B2 * 4/2016 Cregg ................. G07C 9/00111
(Continued)

OTHER PUBLICATIONS

Hwang et al.; Wireless access monitoring and control system based on digital door lock ; Published in: IEEE Transactions on Consumer Electronics (vol. 53 , Issue: 4 ); pp. 1724-1730; Date of Publication: Nov. 2007; IEEE Xplore.*
(Continued)

*Primary Examiner* — Bradley Holder
(74) *Attorney, Agent, or Firm* — Taft Stettinius & Hollister LLP (57) ABSTRACT

Methods and systems for controlling a network access control system that includes a server encrypting a first identifier that can be related to a registered user and communicating the encrypted first identifier to the mobile device. The lock device receives, from the mobile device, a first data set that includes at least the encrypted first identifier. The lock device may encrypt the first data set to generate a second data set and communicates the encrypted second data set to the mobile device. The server receives a third data set that includes at least the encrypted second data set and a second identifier that can also be related to the registered user. The server extracts from the communicated third data set the first and second identifiers, and the extracted first and second identifiers are compared to verify that the second identifier is indeed related to the first identifier.

25 Claims, 4 Drawing Sheets

Related U.S. Application Data (60) Provisional application No. 62/023,079, filed on Jul. 10, 2014.

(51) Int. Cl.
*H04L 9/32* (2006.01)
*H04W 12/08* (2009.01)

(52) U.S. Cl.
CPC ........ *H04L 63/0428* (2013.01); *H04L 63/061* (2013.01); *H04L 63/08* (2013.01); *H04L 63/0823* (2013.01); *H04L 63/0876* (2013.01); *H04W 12/08* (2013.01)

(56) References Cited

U.S. PATENT DOCUMENTS

| | | | | |
|---|---|---|---|---|
| 2003/0074936 A1* | 4/2003 | Conforti | ............ | G07C 9/00103 70/277 |
| 2004/0261478 A1* | 12/2004 | Conforti | ............ | G07C 9/00103 70/277 |
| 2007/0247276 A1* | 10/2007 | Murchison | ......... | G07C 9/00087 340/5.2 |
| 2007/0247277 A1* | 10/2007 | Murchison | ......... | G07C 9/00087 340/5.2 |
| 2008/0310623 A1 | 12/2008 | Phillips et al. | | |
| 2010/0141381 A1* | 6/2010 | Bliding | .............. | G07C 9/00309 340/5.61 |
| 2011/0158412 A1 | 6/2011 | Kako | | |
| 2011/0311052 A1 | 12/2011 | Myers et al. | | |
| 2012/0151976 A1* | 6/2012 | Koether | .................. | G07C 9/02 70/263 |
| 2012/0157079 A1 | 6/2012 | Metivier | | |
| 2012/0213362 A1* | 8/2012 | Bliding | .............. | G07C 9/00309 380/44 |
| 2012/0222103 A1* | 8/2012 | Bliding | .............. | G07C 9/00103 726/7 |
| 2013/0257589 A1* | 10/2013 | Mohiuddin | ............ | G08C 17/02 340/5.61 |
| 2013/0293351 A1* | 11/2013 | Kuenzi | ................... | G06F 21/35 340/5.73 |
| 2014/0020437 A1* | 1/2014 | Bliding | ................... | E05B 49/00 70/283.1 |
| 2014/0022054 A1* | 1/2014 | Bliding | ................... | E05B 49/00 340/5.61 |
| 2014/0049370 A1* | 2/2014 | Eberwine | ........... | G07C 9/00174 340/5.61 |
| 2015/0116080 A1* | 4/2015 | Cregg | ................. | G07C 9/00111 340/5.54 |

OTHER PUBLICATIONS

Verma et al.; A Digital Security System with Door Lock System Using RFID Technology; International Journal of Computer Applications (0975-8887); vol. 5—No. 11, Aug. 2010; Citeseer.*
Hwang et al.; Wireless Access Monitoring and Control System Based on Digital Door Lock; published in IEEE Transactions on Consumer Electronics; vol. 53, Issue 4; pp. 1724-1730; Nov. 2007; IEEE Xplore.
Verma et al.; A Digital Security System with Door Lock System Using RFID Technolog; International Journal of Computer Applications (0975-8887); vol. 5, No. 11; Aug. 2010; Citeseer.
International Search Report; International Searching Authority; International PCT Application No. PCT/US2015/039979; Oct. 6, 2015; 2 pages.
Written Opinion; International Searching Authority; International PCT Application No. PCT/US2015/039979; Oct. 6, 2015; 6 pages.
New Zealand Examination Report; New Zealand Patent Office; New Zealand Application No. 728318; dated Aug. 4, 2017; 9 pages.
Australian Examination Report; Australian Patent Office; Australian Application No. 2015287628; dated Aug. 25, 2017; 3 pages.

* cited by examiner

NETWORKED ACCESS CONTROL SYSTEM

CROSS-REFERENCE TO RELATED APPLICATIONS

The present application is a continuation of U.S. patent application Ser. No. 14/796,501 filed Jul. 10, 2015, which claims the benefit of U.S. Provisional Patent Application No. 62/023,079 filed Jul. 10, 2014, the contents of each application hereby incorporated by reference in their entirety.

BACKGROUND

Security management systems often utilize hardware such as, for example, electronic lock devices, to control the ingress and/or egress through an entryway. Often the operation of such lock devices requires that a static encryption key or code be transmitted to, and/or detected by, the lock device. If the authenticity of the static encryption key is verified, authorization may be granted for the displacement of a locking mechanism of the lock device from an unlocked and/or locked position so that the associated entryway barrier such as, for example, a door or gate, may be displaced to/from open and/or closed position(s).

However, reliance on static encryption keys or codes may compromise the effectiveness of the security system. For example, static keys are susceptible of being obtained through illicit means and/or by unauthorized users via networking hacking techniques including, for example, man-in-the-middle, relay, and replay style active eavesdropping and attacks. Moreover, as the same static encryption key may be repeatedly transmitted and/or continuously used to operate and/or configure the lock device, use of static encryption keys may provide more opportunities for the static encryption key to be hijacked. Further, unauthorized operation of a lock device using a hijacked, but authentic, static encryption key code may be relatively difficult to detect.

BRIEF SUMMARY

An aspect of embodiments of the current invention is a method for controlling a network access control system having a server, a mobile device, and a lock device. The method includes encrypting, by the server, a first identifier associated with a registered user of the mobile device and communicating the encrypted first identifier to the mobile device. The lock device receives, from the mobile device, a first data set that includes at least the encrypted first identifier. The method also includes encrypting, by the lock device, at least the received first data set to generate a second data set and communicating the encrypted second data set from the lock device to the mobile device. The server receives, from the mobile device, a third data set that includes at least the encrypted second data set and a second identifier, the second identifier being associated with a registered user of the mobile device. The server extracts from the communicated third data set the first and second identifiers, and the extracted first and second identifiers are compared to verify that the second identifier is related to the first identifier.

Another aspect of embodiments of the present invention is a method for controlling a network access control system having a server, a mobile device, and a lock device that includes installing on the lock device an encryption key and communicating to an application on the mobile device an encrypted application token, the encrypted application token including a first identifier. The method also includes the lock device receiving, from the application, the encrypted application token. The lock device further encrypts at least the communicated encrypted application token using the using the assigned encryption key to generate lock encrypted data. The lock encrypted data is communicated from the lock device to the application. The method further includes the server receiving the lock encrypted data and a second identifier from the mobile device and a second identifier, with the first and second identifiers being related to each other. Using the assigned encryption key, the server decrypts the lock encrypted data to extract the encrypted application token and the second identifier. The server also decrypts the extracted encrypted application token to extract the first identifier, and verifies that the extracted first identifier is related to the extracted second identifier. The method further includes encrypting, based verification of the first and second identifiers are similar and using the assigned encryption key, lock capture data that includes a first key for decrypting the encrypted application token. Additionally, the lock device may decrypt the lock capture data using the assigned encryption key.

Another aspect of embodiments of the present invention is a method for controlling a network access control system having a server, a mobile device, and a lock device that includes assigning a registered user account a first key, and assigning the lock device an encryption key. The method also includes encrypting at least a first identifier related to the registered user account using the first key to generate an encrypted application token, and communicating the encrypted application key from the server to the mobile device. The lock device receives the encrypted application token and a second identifier from the mobile device, with the second identifier being related to the registered user account. Using the encryption key, the lock device encrypts the encrypted application token and the second identifier to generate lock encrypted data and communicates the lock encrypted data from the lock device to the mobile device. The server receives the lock encrypted data from the mobile device and decrypts the lock encrypted data using the assigned encryption key to extract the second identifier. The encrypted application token from the decrypted lock encrypted data is also decrypted using the first key to extract the first identifier. The method also includes comparing the extracted first and second identifiers to verify that the second identifier is related to the first identifier.

Other aspects of the present invention will become apparent by consideration of the detailed description and accompanying drawings.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Figure 1:
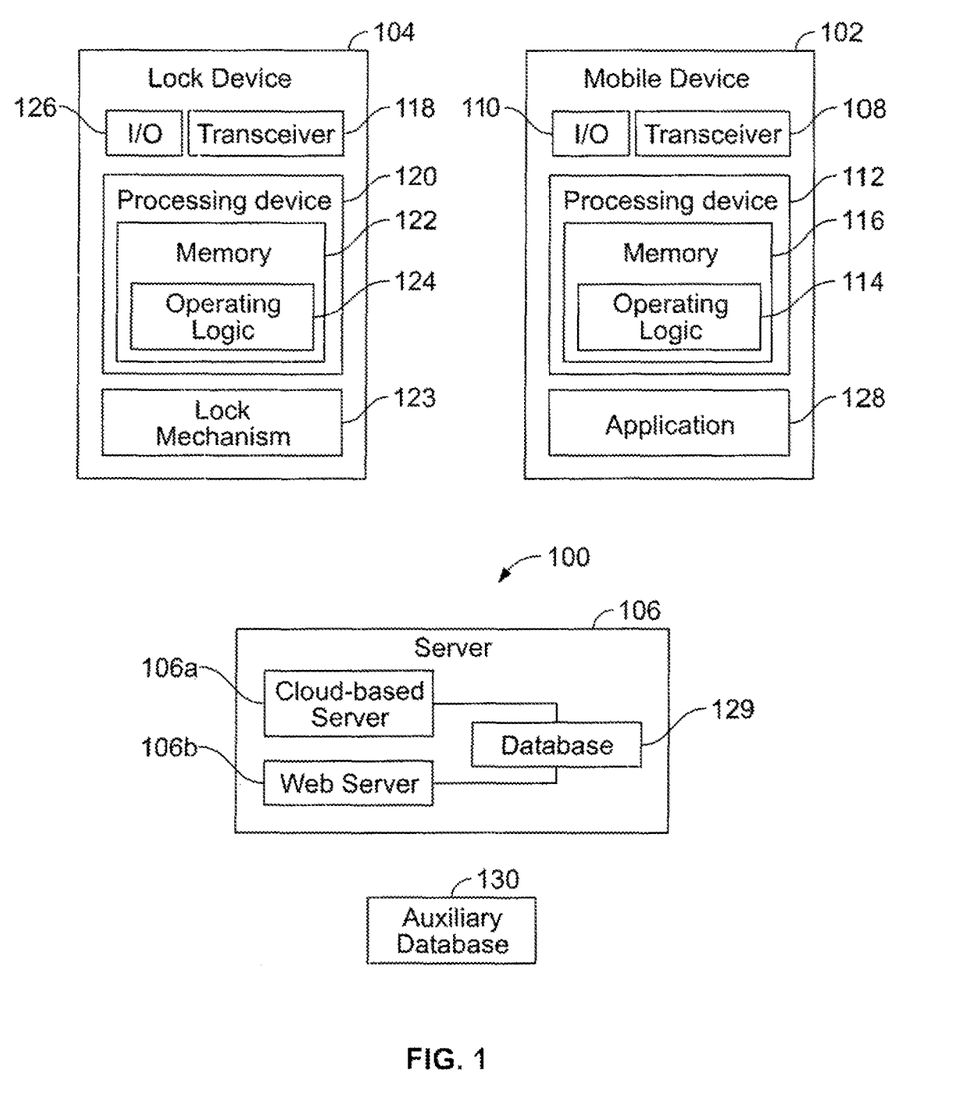
FIG. 1 illustrates a schematic diagram of an exemplary access control system that includes a mobile device, a lock device, and a server according to an illustrated embodiment of the present invention.

FIG. 1 illustrates a schematic diagram of an exemplary access control system 100 that includes a mobile device 102, a lock device 104, and a server 106 according to an illustrated embodiment of the present invention. A variety of mobile devices 102 may be utilized including, for example, a mobile telephone, smartphone, tablet, personal computing device, and/or a proprietary hand-held device, among other devices. According to the illustrated embodiment, the mobile device 102 may have one or more transceivers 108 for communicating data with other devices, including the lock device 104 and the server 106. Additionally, a variety of different types of transceivers 108 may be used including, for example, active and passive transceivers that may communicate via Bluetooth (including Bluetooth low energy) and/or WIFI. The mobile device 102 may also include an input/output device 110 such as, for example, a keypad, display, and/or touch screen among other input/output devices 110. Additionally, the mobile device may include may include one or more different processing devices 112 such as, for example, programmable, dedicated, and/or hardwired state machine types of processors, as well as any combination thereof. For example, according to certain embodiments, the processing device 112 may include multiple processors and may be of a programmable variety that executes algorithms and processes data in accordance with an operating logic 114 as defined by programming instructions (such as software or firmware) stored in a memory 116.

The lock device 104 may be a lock, reader device, a payment terminal, and/or any other type of device that can communicate with the mobile device 102. For example, in the embodiment shown in FIG. 1, the lock device 104 is an electronic lock device having one or more transceivers 118, a processing device 120, a memory 122, and a lock mechanism 123 such as, for, example, bolt and/or latch. The memory 122 may or may not be part of the processor 120. The mobile device 102 and lock device 104 may be adapted to communicate with each other using one or more of a variety of different wireless communication technologies. For example, according to certain embodiments, the lock device 104 may have a transceiver 118 that allows for Bluetooth low energy communication between the mobile device 102 and the lock device 104. Further, according to certain embodiments, the mobile device 102 and the lock device 104 may communication via NFC and/or WIFI (such as WIFI Direct).

A variety of different types of processing devices may be employed for the processing device 120 of the lock device 104 such as, for example, a programmable, dedicated, and/or hardwired state machine, or any combination thereof. The processing device 120 may further include multiple processors such as, for example, Arithmetic-Logic Units (ALUs), Central Processing Units (CPUs), Digital Signal Processors (DSPs), or the like. Processing devices 120 with multiple processing units may also utilize distributed, pipelined, and/or parallel processing. The processing device 120 may also be dedicated to performance of just the operations described herein or may be utilized in one or more additional applications. In the depicted form, the processing device 120 is of a programmable variety that executes algorithms and processes data in accordance with operating logic 124 as defined by programming instructions (such as software or firmware) stored in the memory 122 of the lock device 104. Alternatively or additionally, the operating logic 124 is at least partially defined by hardwired logic or other hardware. The processing device 120 may include one or more components of any type suitable to process the signals received from an input/output device 126 of the lock device 107 such as, for example, the keypad, or elsewhere, and to provide desired output signals. Such components may include digital circuitry, analog circuitry, or a combination of both.

The memory 122 of the lock device 104 may be included with the processing device 120 and/or coupled to the processing device 120. Further, the memory 122 may be of one or more types, such as a solid-state variety, electromagnetic variety, optical variety, or a combination of these forms. Additionally, the memory 122 can be volatile, nonvolatile, or a combination of these types, and some or all of the memory 122 can be of a portable variety, such as a disk, tape, memory stick, cartridge, or the like. In addition, according to certain embodiments, the memory 122 can store data that is manipulated by the operating logic 124 of processing device 120, such as data representative of signals received from and/or sent to the input/output device 126 in addition to, or in lieu of, storing programming instructions defining the operating logic 124.

The server 106 may include one or more servers 106a, 106b that may communicate with the mobile device 102 and/or the lock device 104 in a variety of different manners including, for example, over the Internet, a cellular data network, or any combination thereof. According to certain embodiments, at least one server 106 is a cloud-based server 106a. However, a variety of other different types of servers may also be used for the one or more servers 106 including, for example, a web-based server 106b. Further, according to certain embodiments, different servers 106 may be used for different purposes such as, for example, a cloud-based server 106a for installation, maintenance, and/or management of, or relating to, the access control system 100, lock device 104, and/or the mobile device 102, and another, different server 106 such as, for example, a web-based server 106b for other purposes such as, for example, general, day-to-day usage and/or operation of the lock device 104.

The access control system 100 may also include an application 128 that is installed on the mobile device 102, and which processes, receives and/or stores data relating to authenticating the application 128, the mobile device 102, and/or the lock device 104. For example, according to certain embodiments, the application 128 may be used in connection with communicating information such as, for example, encrypted security and/or authentication information or data, via the mobile device 104 to/from the server 106 and the lock device 104. Further, as discussed below, the application 128, and thus the mobile device 102, may not be configured to decrypt at least certain encrypted information that is provided to the mobile device 102 from the server 106 and/or the lock device 104. It is also contemplated that the application 128 may include one or more than applications to carry out the various operations described herein.

Figure 2:
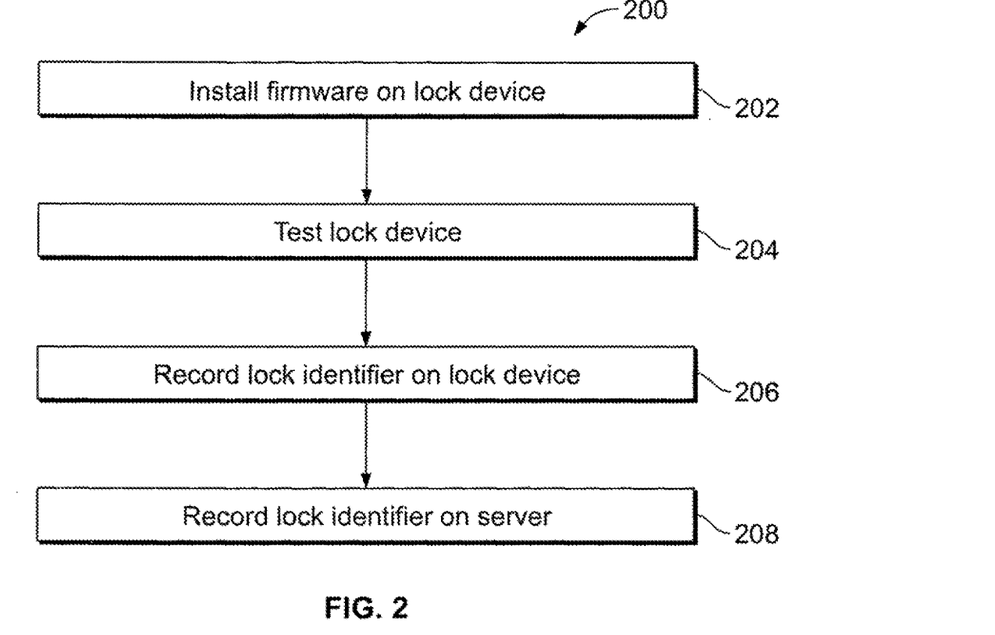
FIG. 2 illustrates a schematic flow diagram of an exemplary process for at least initial programming of the lock device according to an illustrated embodiment of the present invention.

FIG. 2 illustrates a schematic flow diagram of an exemplary process 200 for at least initial programming of the lock device 104 such as, for example, during the manufacturing, production, and/or assembly of the lock device 104 according to an illustrated embodiment of the present invention. Steps illustrated are understood to be exemplary only, and steps may be combined or divided, and added or removed, as well as re-ordered in whole or in part.

At step 202, firmware such as, for example, proprietary firmware used for the operation of the lock device 104 may be installed on the lock device 104, such as, on the memory 122 of the lock device 104. The lock device 104 such as, for example, the installed firmware and/or lock mechanism 123, may then be tested at step 204. At step 206, one or more lock identifiers such as, for example, a serial number for the lock device 104, among other data or information related or assigned to the lock device 104, may be recorded in the lock device 104 such as, for example, in a memory 122 of the lock device 104. Additionally, according to certain embodiments, at step 210, one or more of the lock identifiers may also be recorded in an auxiliary database 130 or other record system for a manufacturer, producer, and/or assembler of the lock device 104, as shown in FIG. 1. Additionally, one or more of the lock identifiers may also be stored, recorded, or otherwise accessible to the server 106. More specifically, according to certain embodiments, a lock identifier(s) may be recorded with, and/or otherwise accessible to, a cloud-based server 106a.

Figure 3:
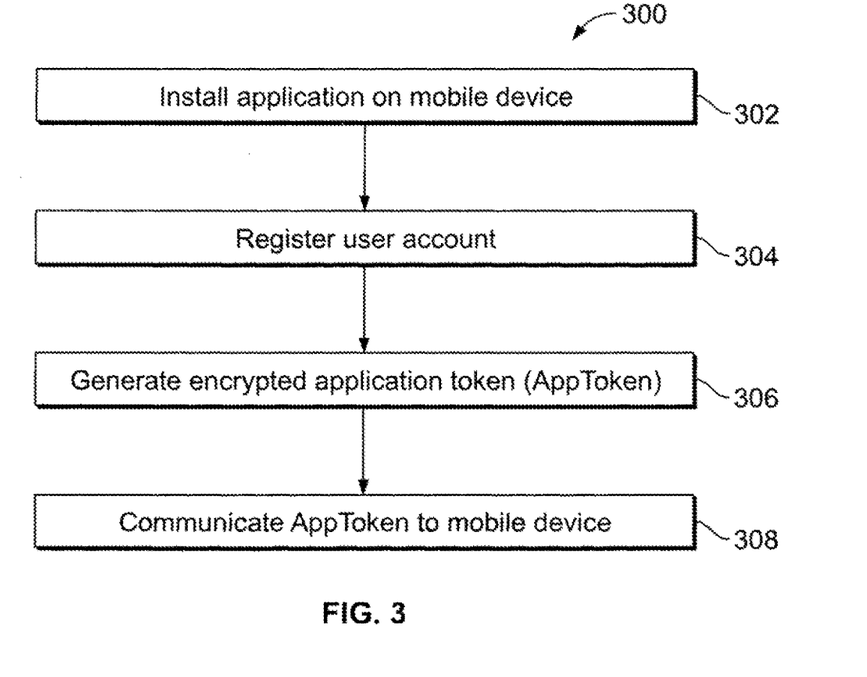
FIG. 3 illustrates a schematic flow diagram of an exemplary process for at least initial set-up of the access control system according to an illustrated embodiment of the present invention.

FIG. 3 illustrates a schematic flow diagram of an exemplary process 300 for at least initial set-up of the access control system 100 according to an illustrated embodiment of the present invention. At step 302, the application 128 is installed on the mobile device 102 such as, for example, by downloading the application 128 from the server 106 (or another server such as a third party server) and subsequently installing the application 128 on the mobile device 102. At step 304, a registered user account associated with the installed application 128 may be created on the server 106 such as, for example, on the cloud-based server 106a. For example, according to certain embodiments, a registered user account may be established for at least one of the following: the mobile device 102 on which the application 128 is installed, the user(s) and/or entity associated with the mobile device 102 having the application 128, and/or one or more of the lock devices 104 associated with the application 128. Further, the registered user account may be associated with a particular institution and a plurality of lock devices 104 for that institution. Further, according to certain embodiments, access and/or control of the registered user account may be controlled through the use of a user name and password. The server 106 may also generate a first identifier (IDENT$_1$) that is associated with the mobile device 102, lock device 104, application 128, and/or the registered user account. For example, the server 106 may generate for each lock device 104 a serial number (S/N), a production code, and/or a counter, among other identifiers that may be included in the first identifier (IDENT$_1$). The server 106 may also, for example, generate identifiers related to the registered user account. Additionally, permission to access, manage, and/or alter settings of the lock device 104 or system 100 may be controlled through the use of authorization levels, which may be set and/or adjusted through commands sent to the server 106. For example, according to certain embodiments, by default, only users and/or particular mobile devices 102 that have a particular authorization level may be able to set, or otherwise alter, the configuration of the lock device 104 via communications from the application 128 and/or mobile device 102.

At step 306, the server 106 may compile the one or more of the various identifiers or data generated at step 306 into one or more strings or functions to provide the first identifier (IDENT$_1$) and encrypt the string(s) or function(s) of the first identifier (IDENT1) with a first encryption key (FK) such as, for example, an encryption key that is associated with, for example, the lock device 104, the server 106, a database 130, and/or the user account to derive an encrypted application token (AppToken). In the illustrated embodiment, the encrypted application token (AppToken) may be expressed as:

$$AppToken=FK(IDENT_1) \quad (Ex. 1)$$

Further, according to the illustrated embodiment, at step 308, the server 106, such as the cloud-based server 106a, may communicate at least the encrypted application token (AppToken) to the application 128 on the mobile device 102. According to the illustrated embodiment, although encrypted data may pass between the server 106 and the lock device 104 through the application 128 and associated mobile device 102, the application 128 and mobile device 102 may not be provided with encryption keys that would allow the application 128 or mobile device 102 to decrypt such information, including the encrypted application token (AppToken). Thus, according to certain embodiments, decryption of encrypted data relating to operation and/or configuration of the lock device 104 may be performed by the server 106 and/or the lock device 104, but not the application 128 and/or mobile device 102.

Figure 4A:
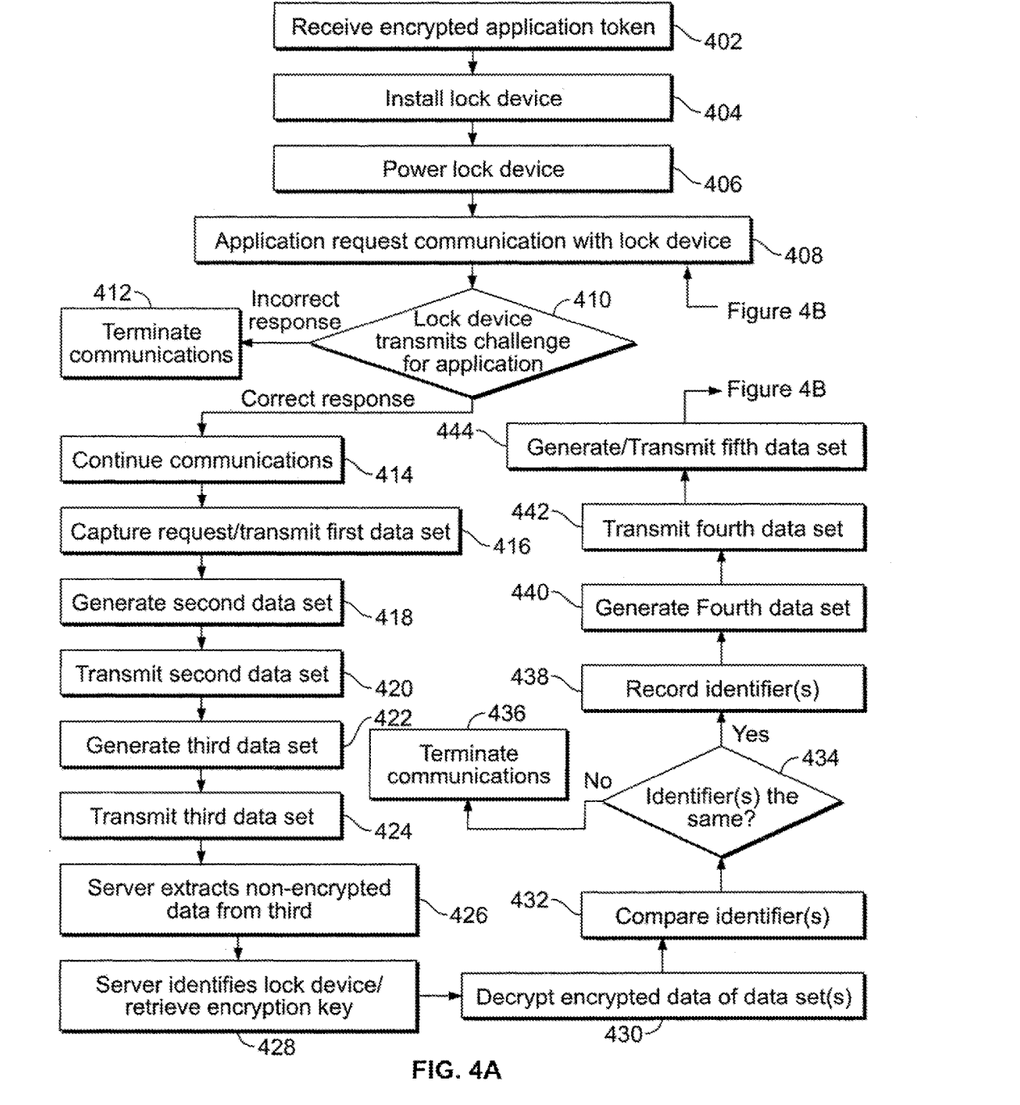
FIGS. 4A and 4B illustrate a schematic flow diagram of an exemplary process for capturing a lock device according to an illustrated embodiment of the present invention.
Figure 4B:
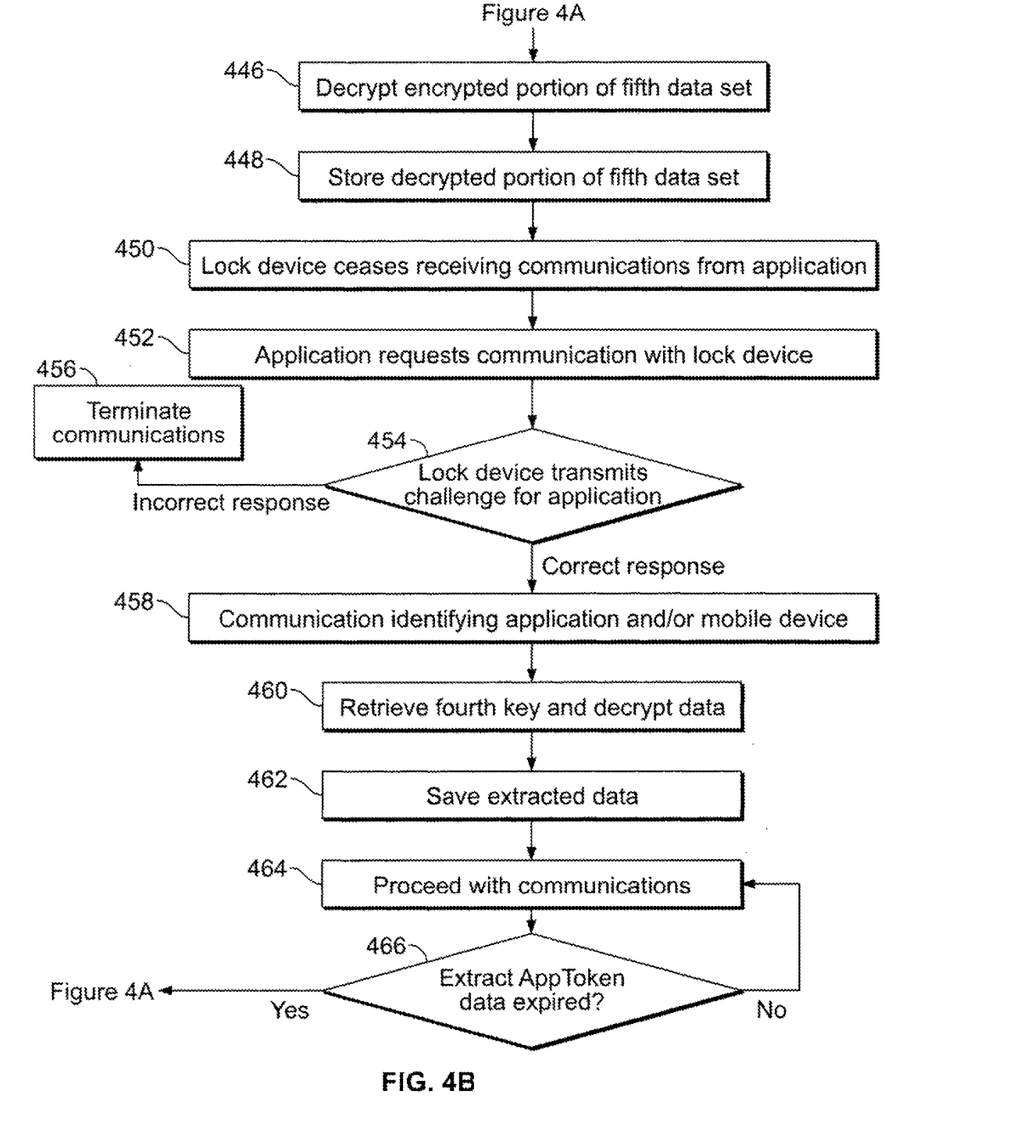

FIGS. 4A and 4B illustrate a schematic flow diagram of an exemplary process 400 for capturing a lock device 104 according to an illustrated embodiment of the present invention. Although data sets are discussed below in terms being encrypted with a particular key, according to certain embodiments, the encryption key used to encrypted the data in the various data sets may be altered such as, for example, being switched with another existing key and/or be replaced by a new key. For example, according to certain embodiments, a trigger event such as, for example, the expiration of a time period, a number of communications between the application 128 and the server 106, or upon the occurrence of a particular random event, among other trigger events, may result in an alteration or change in the encryption key(s) used to encrypt one or more of the data sets. For example, upon expiration of a predetermined time period, at least an encryption key used for encrypting information or data associated with a first data set may be switched with an encryption key that is used for encryption of information or data in a second data set. Further, rather than switching keys, keys used for encryption of data sets may be subsequently replaced by new encryption keys. Additionally, according to certain embodiments, different trigger events may cause different encryption keys to be switched and/or may change the manner in which at least some of the keys are altered. For example, according to certain embodiments, the occurrence of a first trigger event, such as the expiration of a first time period, may result in the second encryption key that was being used in encrypting information or data of a second data set being switched with a third key that had been used for encrypting a third data set, while a first encryption key that was associated with encrypted information or data in a first data set may be replaced by another key such as, for example, a sixth encryption key. Further, upon the occurrence of a second trigger event such as, for example, expiration of a second time period, a fourth key that had been used for encryption of a fourth data set may be switched with the sixth key that was being used with the first data set, and the second and third keys may be replaced with fifth and seventh encryption keys, respectively.

At step 402, the application 128 associated with a registered user account receives the encrypted application token. At step 404, the lock device(s) 104 may be installed at a desired location such as, for example, on a door, wall, and/or door frame, among other locations. At step 406, the lock device 406 may receive power from a power source. Power may be provided to the lock device 104 in a number of manners, including, for example, by an internal power source, such as, for example a battery operably secured to and/or in the lock device 104, and/or from a power source that is external to the lock device 104.

At step 408, an attempt may be undertaken to establish communication between the lock device 104 and the mobile device 102, and thus the application 12. Communication between the lock device 104 and the mobile device 102 may be established in a number of different manners. For example, according to the illustrated embodiment, using at least the transceiver 108 of the mobile device 102, the application 128 may request communication with the lock device 104, with the request for communication being transmitted to the lock device 104. In response to the request for communication, at step 410 the lock device 104 may transmit a challenge to the mobile device 102, and more specifically, for the application 128, that seeks to verify that the mobile device 102 and/or associated application 128 is authorized to at least communicate with the lock device 104. For example, according to certain embodiments, the challenge may be a question or request for particular information from the application 128. If the response from the application 128 and/or mobile device 102 that is communicated to the lock device 104 is incorrect, then at step 412 the lock device 104 may determine that the application 128 and/or mobile device 102 is not authorized to communicate with the lock device 104. The lock device 104 may then terminate communications with the application 128 and/or the mobile device 102. However, if the application 128 provides an accurate or correct response, then at step 414 the lock device 104 may determine that the lock device 104 may continue communicating with the application 128 and/or the associated mobile device 102.

With communication operably established between the application 128 and the lock device 104, at step 416 a request to capture the lock device 104 from the application 128 may be communicated to the lock device 104. The communicated request to capture may include a first data set that may include a variety of information and data relating to the application 128, the mobile device 102, the lock device 104, and/or other aspects of the access control system 100. Further, according to certain embodiments, the first data set may include information and/or data that at least provide an indication that the application 128 has the authority to request capture of the lock device 104 and/or to capture the lock device 104. In the illustrated embodiment, the first data set may be comprised, either collectively and/or individually, of one or more sets of encrypted data and/or one or more types of non-encrypted data or information. For example, in the illustrated embodiment the first data set may include the encrypted application token (AppToken) as well as a non-encrypted first identifier ($IDENT_1$). Additionally, according to certain embodiments, the encrypted and non-encrypted data or information of the first data set may be compiled together in a manner that forms one or more data strings, algorithms, or functions. For example, in the illustrated embodiment, the first data set may be represented by the following expression:

$IDENT_1$,AppToken     (Ex. 2)

At step 418, the lock device 104 may utilize at least a portion of the information in the first data set to generate a second data set, or lock encryption data. According to the illustrated embodiment, the second set of data may include data that is encrypted, or further encrypted, by the lock device 104, as well as non-encrypted data. For example, according to certain embodiments, the second data set may include, in addition to the first data set, a second lock identifier ($IDENT_2$) that has one or more of the identifiers generated at step 304, or other identifiers. Similar to the first identifier ($IDENT_1$), according to certain embodiments, the second identifier ($IDENT_2$) may be, or related to, one or more identifiers associated with the mobile device 102, lock device 104, application 128, and/or correspond to the registered user account. Further, according to certain embodiments, the second identifier ($IDENT_2$) may, or may not, include at least some of the same identifier(s) used for the first identifier ($IDENT_1$). For example, the second lock identifier ($IDENT_2$) may include one or more of the lock identifiers used in the first identifier ($IDENT_1$) such as, for example, a serial number (S/N), production code, or production date, among other lock identifiers. Additionally, the second identifier ($IDENT_2$) may and/or may not be encrypted with the first data set. For example, the second identifier ($IDENT_2$), may be appended to the first data set prior to the first data set being encrypted by the lock device 104 in connection with the generation of the second data set. Such encryption may use the first key (FK) that was used to generate the application token (AppToken), or another, different second encryption key (SK). Additionally, the second data set may also include a non-encrypted second identifier ($IDENT_2$) that may, or may not, contain the same or similar identifier information that was with the second identifier ($IDENT_2$) that was encrypted by the lock device 104 with the first data set. According to such an embodiment, the second data set may be expressed as:

$IDENT_2$,$SK(IDENT_2,IDENT_1,AppToken)$     (Ex. 3)

At step 420, the lock device 104 communicates the second data set to the mobile device 102, and more specifically, for the application 128. According to the illustrated embodiment, at step 422, the application 128 may append non-encrypted information to the second data set to generate a third data set. For example, in the illustrated embodiment, the application 128 may append the second data set to include information relating to a third identifier ($IDENT_3$). According to certain embodiments, the third identifier ($IDENT_3$) may contain the same or similar data or information as the first and second identifiers ($IDENT_1$, $IDENT_2$). According to such an embodiment, the third data set from the application 128 may be represented as:

$IDENT_3,IDENT_2,SK(IDENT_2,IDENT_1,AppToken)$     (Ex. 4)

At step 424, the third data set is communicated from the application 128 via the mobile device 104, to the server 106. For example, according to certain embodiments, the mobile device 102 may transmit the third data set to the cloud-based server 106a. The server 106 may then extract non-encrypted data or information from the application 128 and information that has been encrypted by the lock device 104, to verify that the application 128 and/or mobile device 104 from which the server 106 received the third data set is the related to, and possibly the same as, the application 128 and/or mobile device that communicated with the lock device 104. Therefore, at step 426, the server 106 extracts the non-encrypted data or information from the third data set such as, for example, in the illustrated embodiment, the non-encrypted second identifier ($IDENT_2$) and the third identifier ($IDENT_3$). At step 428, the server 106 may then utilize the extracted non-encrypted data to identify the corresponding lock device 104 and associated information relating to the lock device 104. For example, in the illustrated embodiment, the server 106 may utilize the extracted non-encrypted identifier(s) from the third data set to identify and retrieve, from the database 129 of the server 106 and/or the auxiliary database 130, information relating to the lock device 104.

At step 430, the server 106 may decrypt encrypted information or data from the third data set data and more particularly, encrypted information in the third data set that corresponds to encrypted data from the first and second data sets. For example, according to certain embodiments, the server 106 may utilize extract identifiers from the non-encrypted portion of the second and third identifiers ($IDENT_2$, $IDENT_3$) in the third data set to identify the encryption key(s) that were used to encrypt information in the first and second data sets such as, for example, the first and second keys (FK, SK). For example, according to the illustrated embodiment, the server 106 may utilize the second key (SK) to decrypted the second data set contained in the third data set, and thereby extract the second identifier ($IDENT_2$), the first identifier ($IDENT_1$), and the application token (AppToken). Then, using the associated encryption key such as, for example, the first key (FK), the server 106 may proceed to de-crypt the encrypted application token (AppToken), and thereby extract data or information from the encrypted application token (AppToken) such as, for example, extract the first identifier ($IDENT_1$).

As shown above by at least Exs. 1 and 4b, in the illustrated embodiment, both the non-encrypted and encrypted portions of the third data set included a multiple identifiers ($IDENT_1$, $IDENT_2$, $IDENT_3$) having different levels of encryption, if any. For example, in the illustrated embodiment, the encrypted application token (AppToken) from the first data set, which may be encrypted by the first key (FK) and the non-encrypted first identifier ($IDENT_1$), may be subsequently subjected to encryption by the lock device 104 using the second key (SK). Additionally, as shown by Ex. 3, in the illustrated embodiment, the second data set may also include a second identifier ($IDENT_2$) that was also encrypted, with or without data from the encrypted application token (App-Token), using the second key (SK). Thus, the server 106 may utilize a different number of encryption keys to extract various encrypted information from the third data set.

At step 432, the server 106 may compare two or more of the identifiers ($IDENT_1$, $IDENT_2$, $IDENT_3$) obtained from the third data set such as, for example, comparing the second identifier ($IDENT_2$) that was added to the encrypted application token (AppToken) in the second data set with the first identifier ($IDENT_1$) that was contained in the encrypted application token. Additionally, according to certain embodiments, the server 106 may also compare the third identifier ($IDENT_3$) from the third data set with the extracted first identifier ($IDENT_1$) and/or the extracted second identifier ($IDENT_2$). If the server 106 determines at step 434 that the compared, extracted identifiers are not related such as, for example, are not the same, similar, and/or associated with the same registered user account, application 128, lock device(s) 104, and/or mobile device 102, among other relations, then at step 436 the server 106 may terminate communication with the application 128. If however, the server 106 confirms that the compared, extracted identifiers ($IDENT_1$, $IDENT_2$, $IDENT_3$) are related to each other, the server 106 may record one or more of the identifiers ($IDENT_1$, $IDENT_2$, $IDENT_3$), or portions of the identifiers ($IDENT_1$, $IDENT_2$, $IDENT_3$) to a record or database associated with the lock device 104 such as, for example, a database 129 of the server 106 and/or the auxiliary database 130.

At step 440, the server 106 uses an encryption key such as, for example, a third key (TK) to encrypt a forth data set, or lock data set, that includes encrypt data or information that at least in-part identifies or corresponds to the registered user account, including the application 128 and/or mobile device 102. For example, in the illustrated embodiment, the data or information encrypted by the server 106 at step 440 may include a fourth identifier ($IDENT_4$) and a fourth encryption key (FFK). Further, according to certain embodiments, the third encryption key (TK) may be the same or similar to one of the first or second keys (FK, SK), while the fourth encryption key (FFK) is the same or similar to the other of the first or second keys (FK, SK). Alternatively, according to other embodiments, the third and fourth keys (TK, FFK) may be different than the first and second keys (FK, SK). According to certain embodiments, the information to be encrypted at step 440 may be compiled into one or more strings or functions before encrypting the string(s) or function(s). According to the illustrated embodiment, the fourth data set may be represented as:

$$TK(IDENT_4, FFK) \qquad (\text{Ex. 5})$$

At step 442, the fourth data set may be operably communicated to the application 128. At step 444, the application 128 may then append information such as, for example, un-encrypted data or information, to the fourth data set to generate a fifth data set that is transmitted to the lock device 104. According to the illustrated embodiment, in generating the fifth data set, the application 128 may append to the fourth data a fifth identifier ($IDENT_5$), such that the fifth data set may be expressed as:

$$IDENT_5, TK(IDENT_4, FFK) \qquad (\text{Ex. 6})$$

Again, similar to the first, second, third, and fourth data sets, according to certain embodiment, the non-encrypted and/or encrypted data or information in the fifth data set may be compiled together in a manner that forms one or more data strings, algorithms, or functions.

At step 446, the lock device 104 may decrypt the encrypted portion of the fifth data set. Further, the lock device 104 may record or otherwise store at least a portion of the decrypted data from the fifth data set at step 448, as well as the fourth key (FFK), which may already be recorded by the lock device 104. For example, according to certain embodiments, the lock device 104 may record the further identifier ($IDENT_4$) and/or the fifth identifier ($IDENT_5$) and the fourth key (FFK)) obtained by the lock device 104 decrypting the fifth data set in the memory 122 of the lock device 104. Additionally, at step 450, the lock device 104 may cease, at least temporarily, communications with application 128.

With communications between the lock device 104 and the application 128 terminated, at step 452 a communication requesting communication with the lock device 104 may be transmitted from the application 128 via the mobile device 102. In response to the request for communication, at step 454 the lock device 104 may transmit a challenge to the mobile device 102, and more specifically, for the application 128, that seeks to verify that the mobile device 102 and/or associated application 128 is authorized to at least communicate with the lock device 104. If the response from the application 128 that is communicated to the lock device 104 via the mobile device 102 is incorrect, then at step 456 the lock device 104 may determine that the application 128 and thus the mobile device 102 is not authorized to communicate with the lock device 104, and the lock device 104 will refuse to communicate with the application 128 and/or mobile device 102. However, if the application 128 provides an accurate or correct response, then at step 458 the lock device 104 may receive a communication that at least provides information identifying the application 128 and/or lock device 104. For example, according to the illustrated embodiment, at step 458, the lock device 104 may receive, from the application 128 via the mobile device 102, a sixth identifier ($IDENT_5$), which may be encrypted using the fourth key (FFK). At step 460, the lock device 104 may retrieve from its memory 122 the stored fourth key (FFK) and decrypt the encrypted data or information in the sixth identifier ($IDENT_6$). The lock device 104 may thereby identify that the application 128 is authorized to communicate with the lock device 104, without requiring a connection between the lock device 104 and the server 106. At step 462, the lock device 104 may save the extracted information from the sixth identifier ($IDENT_6$).

With authentication established, at step 464 the lock device 104 and application 128 may proceed with communicating with each other. For example, according to certain embodiments, the lock device 104 and application 128 may communicate with each other using a temporary encrypted key (TempK). Such communications may allow for a variety of different operations of the lock device 104 such as, for example, configuration of the lock device 104 through use of the application 128. Moreover, such configuration of the lock device 104 may then proceed without the lock device 104 having to repeatedly communicate with the server 106.

At step 466, the lock device 104 may erase, destroy, ignore, or otherwise discard at least a portion of information associated with communications between the lock device 104 and the application 128 such as, for example, the fourth key (FFK), the temporary encrypted key (TempK), among other information or data. Such discarding of information may occur at predetermined intervals such as, for example, after a predetermined time period, number of communications between the application 128 and the lock device 104, time period between subsequent communications between the application 128 and the lock device 104, number of times the lock device 104, or associated lock mechanism 123, has been operated. For example, in the illustrated embodiment, the information associated with communications between the lock device 104 and the application 128 may be discarded from the lock device 104 every 6 hours, 12 hours, or 24 hours. Thus, after the such information has been discarded, the application 128 may need to contact the server 106 to retrieve at least a new AppToken, thereby imparting the system 100 with at least a degree of dynamic keying. With the generation of a new AppToken, the application 128 may again contact the lock device 104 at step 408 and proceed again with recapturing the lock device 104.

Various features and advantages of the present invention are set forth in the following claims. Additionally, changes and modifications to the described embodiments described herein will be apparent to those skilled in the art, and such changes and modifications can be made without departing from the spirit and scope of the present invention and without diminishing its intended advantages.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for controlling a network access control system, the method comprising:
   receiving, by a mobile device and from a server, an application token, wherein the application token includes a first identifier associated with the mobile device and encrypted by a first cryptographic key;
   transmitting, by the mobile device and to a lock device, a first data set including the application token;
   receiving, by the mobile device and from the lock device, a second data set generated by the lock device based on the first data set and including a second identifier and a first data subset encrypted by a second cryptographic key, wherein the first data subset includes the first identifier and the application token, and wherein the second identifier is associated with at least one of the mobile device, the lock device, an application of the mobile device, or a registered user;
   generating, by the mobile device, a third data set based on the second data set and including a third identifier, wherein the third data set includes the second identifier, the third identifier, and the first data subset encrypted by the second cryptographic key; and
   transmitting, by the mobile device, the third data set to the server for extraction of the first identifier and the second identifier from the third data set and verification that the first identifier is related to the second identifier.

2. The method of claim 1, wherein the first identifier is associated with an application installed on the mobile device.

3. The method of claim 1, wherein the first identifier is further associated with at least one of the lock device or a registered user account.

4. The method of claim 3, wherein the first identifier includes at least one of a serial number of the lock device, a production code of the lock device, or a counter.

5. The method of claim 1, wherein the first data set further includes an unencrypted version of the first identifier.

6. The method of claim 1, wherein the first data subset further includes the second identifier.

7. The method of claim 1, further comprising receiving, by the mobile device and from the server, a fourth data set in response to verifying that the first identifier is related to the second identifier.

8. The method of claim 7, wherein the fourth data set includes a second data subset encrypted by a third cryptographic key, the second data subset including a fourth identifier and a fourth cryptographic key, and the fourth identifier associated with at least one of the mobile device, the application, or the registered user account.

9. The method of claim 8, wherein the third cryptographic key is one of the first cryptographic key and the second cryptographic key and the fourth cryptographic key is another of the first cryptographic key and the second cryptographic key.

10. The method of claim 8, wherein each of the first cryptographic key, the second cryptographic key, the third cryptographic key, and the fourth cryptographic key is a distinct cryptographic key.

11. The method of claim 1, wherein the transmitting the first data set to the lock device comprises indicating a request to capture the lock device by the application of the mobile device.

12. The method of claim 1, wherein verification that the first identifier is related to the second identifier comprises at least one of:
   (i) verification that the application of the mobile device from which the server received the third data set is related to an application that communicated with the lock device to transmit the first data set; or
   (ii) verification that the mobile device from which the server received the third data set is related to the mobile device that transmitted the first data set to the lock device.

13. A plurality of non-transitory machine-readable storage media comprising a plurality of instructions stored thereon that, in response to execution by a mobile device, results in the mobile device:
   receiving, by the mobile device from a server, an application token, wherein the application token includes a first identifier associated with the mobile device and encrypted by a first cryptographic key;
   transmitting a first data set including the application token to a lock device;
   receiving, from the lock device, a second data set generated by the lock device based on the first data set and including a first data subset encrypted by a second cryptographic key and a second identifier associated with at least one of the mobile device, the lock device, an application of the mobile device, or a registered user, the first data subset including the first identifier and the application token;
   generating a third data set based on the second data set and including the second identifier, a third identifier, and the first data subset encrypted by the second cryptographic key; and
   transmitting the third data set to the server for extraction of the first identifier and the second identifier from the third data set and verification that the first identifier is related to the second identifier.

14. The plurality of non-transitory machine-readable storage media of claim 13, wherein the first data set further includes an unencrypted version of the first identifier;
   the first data subset further including the second identifier.

15. The plurality of non-transitory machine-readable storage media of claim 13,
   wherein the plurality of instructions further causes the mobile device to receive, from the server, a fourth data set in response to verifying that the first identifier is related to the second identifier.

16. The plurality of non-transitory machine-readable storage media of claim 15, wherein the fourth data set includes a second data subset encrypted by a third cryptographic key, the second data subset including a fourth identifier and a fourth cryptographic key, and the fourth identifier associated with at least one of the mobile device, the application, or the registered user account.

17. The plurality of non-transitory machine-readable storage media of claim 16, wherein the third cryptographic key is one of the first cryptographic key and the second cryptographic key and the fourth cryptographic key is another of the first cryptographic key and the second cryptographic key.

18. The plurality of non-transitory machine-readable storage media of claim 16, wherein each of the first cryptographic key, the second cryptographic key, the third cryptographic key, and the fourth cryptographic key is a distinct cryptographic key.

19. A network access control system, comprising:
   at least one processing device; and
   at least one memory comprising a plurality of instructions stored thereon that, in response to execution by the at least one processing device, causes the network access control system to:
   receive, by a mobile device and from a server, an application token, wherein the application token includes a first identifier associated with the mobile device and encrypted by a first cryptographic key;
   transmit, by the mobile device and to a lock device, a first data set including the application token;
   receive, by the mobile device and from the lock device, a second data set generated by the lock device based on the first data set, wherein the second data set includes a first data subset encrypted by a second cryptographic key and a second identifier, wherein the first data subset includes the first identifier and the application token, and wherein the second identifier is associated with at least one of the mobile device, the lock device, an application of the mobile device, or a registered user;
   generate, by the mobile device, a third data set based on the second data set, wherein the third data set includes the second identifier, a third identifier, and the first data subset encrypted by the second cryptographic key; and
   transmit, by the mobile device, the third data set to the server for extraction of the first identifier and the second identifier from the third data set and verification that the first identifier is related to the second identifier.

20. The network access control system of claim 19, wherein transmission of the first data set to the lock device is indicative of a request to capture the lock device by the application of the mobile device.

21. The network access control system of claim 19, wherein the first data set further includes an unencrypted version of the first identifier; and
   wherein the first data subset further includes the second identifier.

22. The network access control system of claim 19, wherein the plurality of instructions further causes the network access control system to receive, by the mobile device from the server, a fourth data set in response to verifying that the first identifier is related to the second identifier.

23. The network access control system of claim 19, wherein the fourth data set includes a second data subset encrypted by a third cryptographic key, the second data subset including a fourth identifier and a fourth cryptographic key, and the fourth identifier associated with at least one of the mobile device, the application, or the registered user account.

24. The network access control system of claim 19, wherein the third cryptographic key is one of the first cryptographic key and the second cryptographic key and the fourth cryptographic key is another of the first cryptographic key and the second cryptographic key.

25. The network access control system of claim 19, wherein each of the first cryptographic key, the second cryptographic key, the third cryptographic key, and the fourth cryptographic key is a distinct cryptographic key.

* * * * *